Dec. 8, 1925.

R. P. BROWN

RECORDING METER

Filed Dec. 17, 1924

INVENTOR
RICHARD P. BROWN
BY
J. E. Hubbell
ATTORNEY

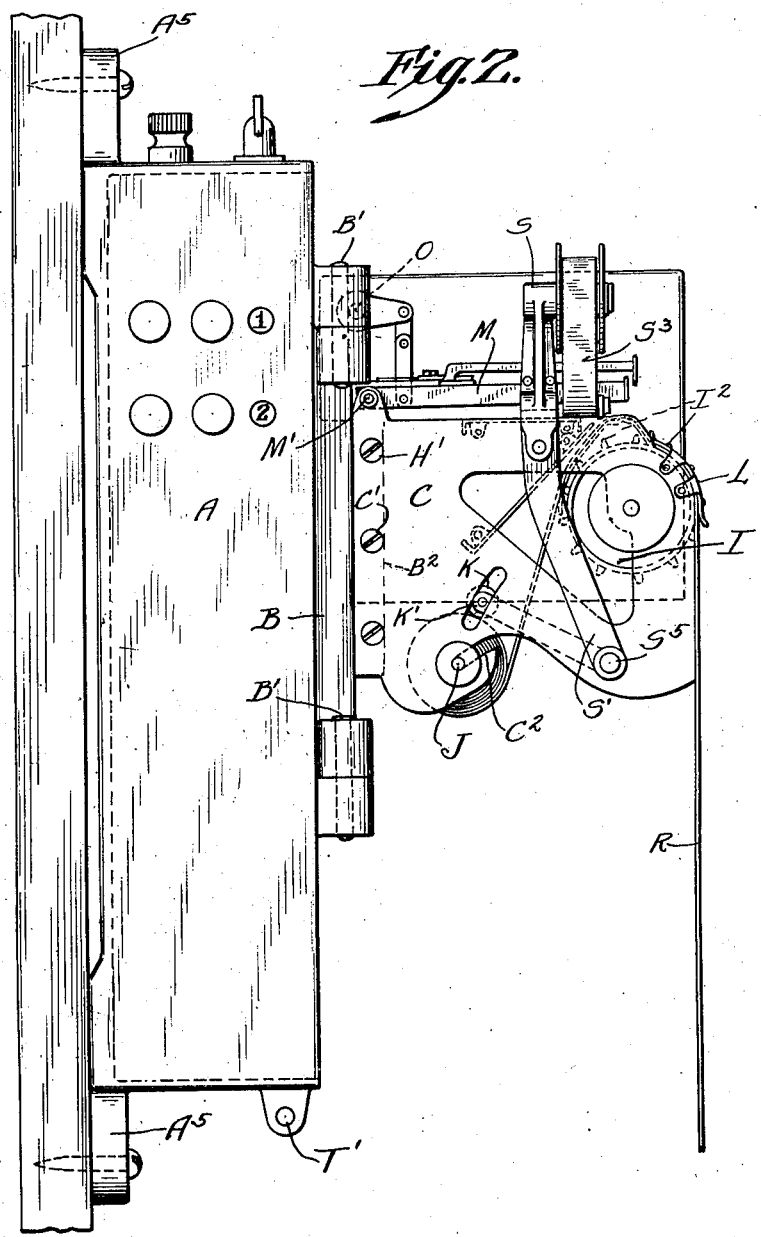

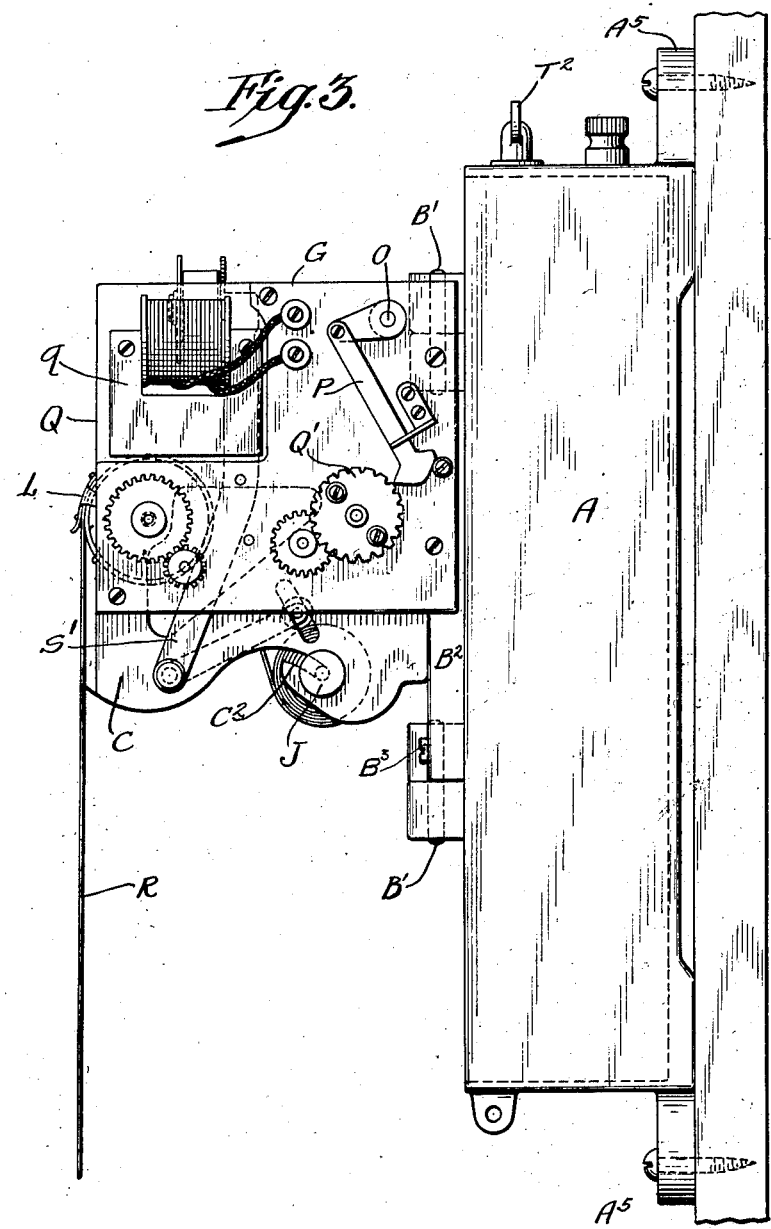

Dec. 8, 1925.
R. P. BROWN
RECORDING METER
Filed Dec. 17, 1924
1,564,518
4 Sheets-Sheet 4
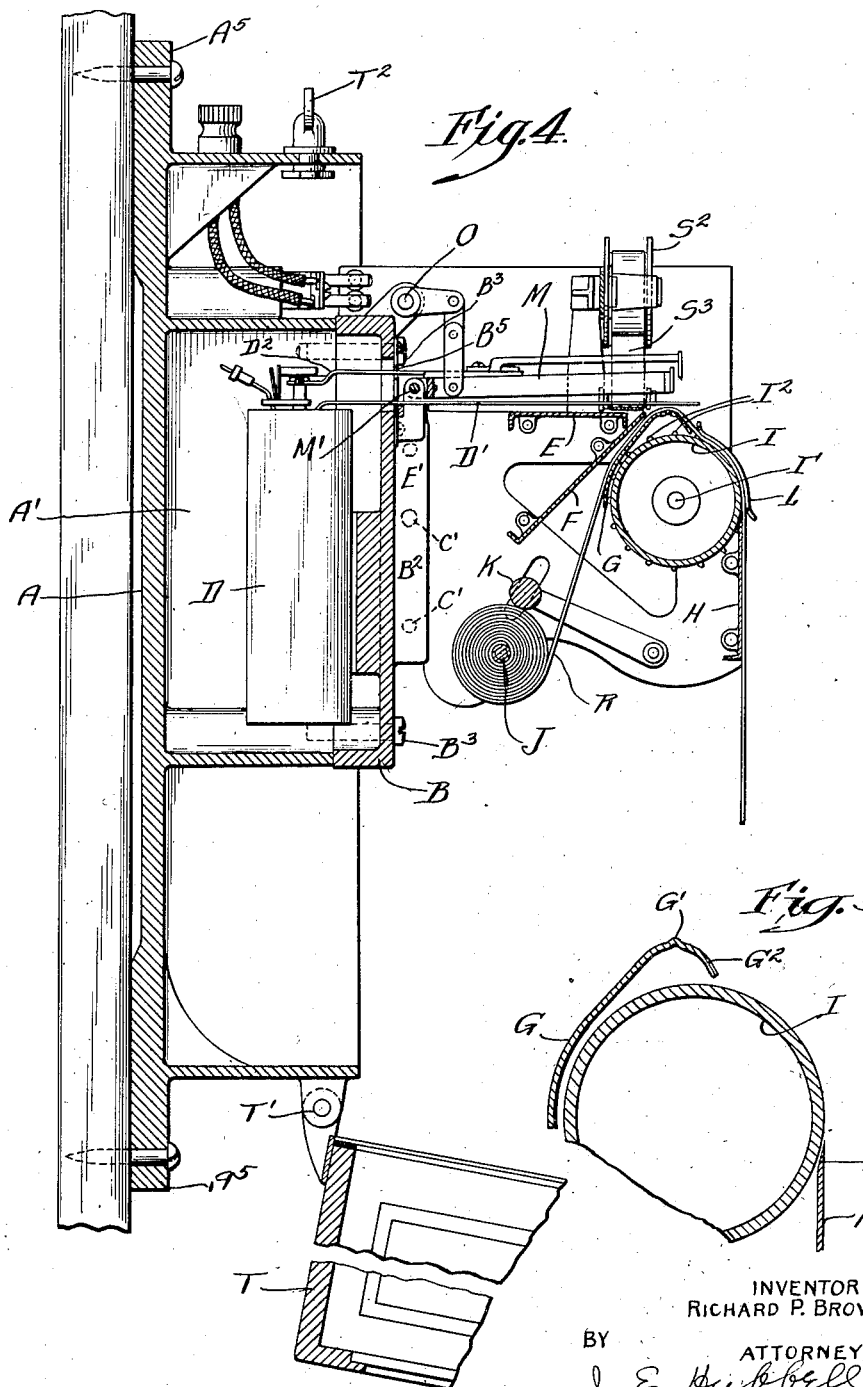

Patented Dec. 8, 1925.

1,564,518

UNITED STATES PATENT OFFICE.

RICHARD P. BROWN, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

RECORDING METER.

Application filed December 17, 1924. Serial No. 756,435.

*To all whom it may concern:*

Be it known that I, RICHARD P. BROWN, a citizen of the United States, and resident of Philadelphia, in the county of Philadelphia and State of Pennsylvania, have invented certain new and useful Improvements in Recording Meters, of which the following is a specification.

My present invention relates to recording instruments such as electric recording pyrometers and the like, in which a record is made on a travelling record sheet by depressing the pointer of a meter element into contact with the record surface at regular intervals. The general object of the invention is to provide an improved instrument of the character described characterized in general by the simplicity and effectiveness of the provisions for supporting and advancing the record sheet, and in particular by the general arrangement of such provisions, as well as by specific features of construction thereof, whereby the record produced is in position to be inspected immediately, or very shortly after the record is made, and whereby portions of record sheet on which a record has been made may be severed soon after the record is made from the portion of the record sheet on which a record is being made without interfering with the continued record formation.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter, in which I have illustrated and described a preferred embodiment of the invention.

Of the drawings:

Fig. 2 is an elevation of one side of the instrument with the front cover removed;

Fig. 3 is an elevation of the opposite side of the instrument with the front cover removed;

Fig. 4 is a section on the line 4—4 of Fig. 1; and

Fig. 5 is a section taken similarly to Fig. 4, but on a larger scale, of a portion of the record sheet supporting and advancing means.

Figure 1:
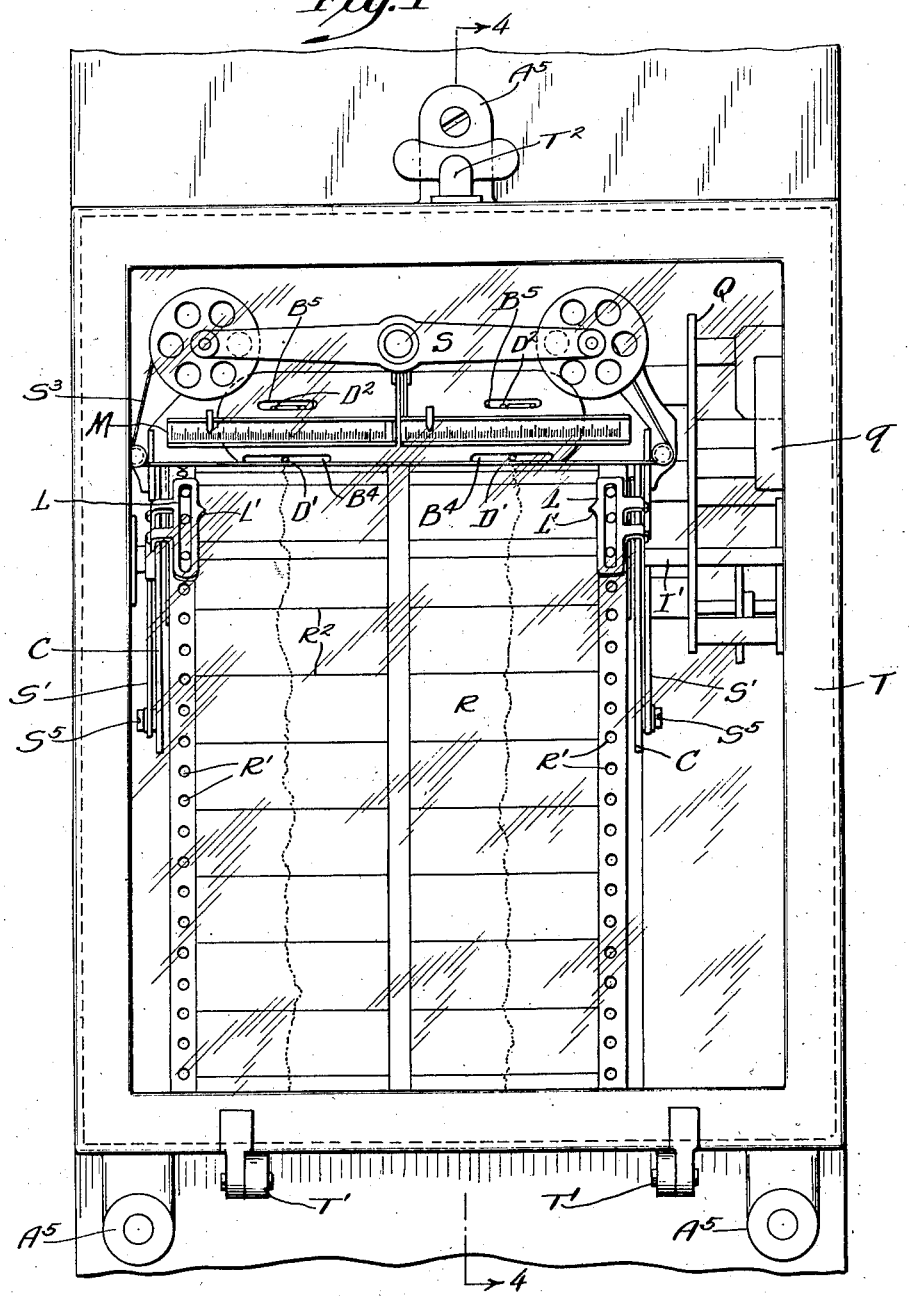
Fig. 1 is a front elevation of the instrument.

In the drawings, I have illustrated my invention in a duplex electric pyrometer comprising two separate meter elements D, each having a pointer D', and mechanism for recording the variable positions of the two pointers D' on a single record sheet R, but it is to be understood that my invention may be used as well in an instrument comprising a single meter element D, or more than two such elements, and that each meter element of the instrument may have its movements recorded on an individual record sheet, if desired.

As shown, the meter elements D are secured to the rear side of the meter element support B which is in the form of a door hinged to a stationary meter housing part A formed with a meter chamber A' of box-like shape, the rear, top, bottom and side walls of which are formed by integral portions of the housing part A, while the meter element support B forms a hinged door for the chamber A'. $B^3$ represents the movable clamping screws normally securing the support B in fixed position against the housing member A. The meter pointers D' project through slots $B^4$ in the support B. As shown, adjusting devices $D^2$ of known form for setting the movable systems of the meter elements into the proper zero or open circuit positions, also extend through slots $B^5$ in the member B. The recording mechanism comprises a motor mechanism Q advantageously attached to the free edge of the door or meter element support B, and the mechanism for supporting the record sheet R and cooperating with the pointers D' to make records on the record sheet R, is mounted on the front side of the member B. The meter housing, including the member B which form the support for the meter elements D and the cooperating recording mechanism, and also forms a door for the chamber A' in which the meter elements proper are normally received, form no part of the present invention, and while novel with me, are not claimed herein, but form the subject matter of a co-pending application, Serial No. 756,475 filed of even date herewith.

The present invention is concerned with the construction and arrangement of the means for supporting and advancing the record sheet R now to be described. Secured to the front side of the cover or supporting member B is a frame shown as comprising a pair of sheet metal side members C, and members E, F, G, and H, also advantageously formed of sheet metal, which extend between and space apart the two side members C, each of the members E, F, G, and H being secured at its ends to, and serving to tie together the two side members C. The two side members C which extend perpendicularly away from the front side of the member B are secured to the latter, as by means of screws C' threaded into vertical ribs B² formed for the purpose on the front side of the member B.

The record sheet R, which normally is a paper web or strip, is drawn from a supply roll wound on a spindle J. The latter is removably received in open bearing slots C² formed in the side members C adjacent their lower edges. K represents a weighted tension roll normally bearing on the periphery of the supply roll and carried by arms K' swinging about a supporting shaft S⁵ mounted at its ends in the side plates C. The record strip R passes from the supply roll up between the members F and G and over the latter into contact with the feed roll I. The latter is carried by a spindle I' journaled in the end members C and also in the housing or supporting frame of the motor Q by which the spindle I is rotated. The feed roll I, as is usual in instruments of the character illustrated, is formed at its ends with sprocket teeth I² which enter previously formed and suitably spaced holes R' formed in the record strip R at the opposite edges of the latter. The paper R is held in contact with the roll by slotted guide clips L which overlap the record strip at the opposite side edges of the latter. The clips L are secured to the side frame members C, and have their ends bent away from the roll I to permit the sprocket teeth to enter and leave the slots in the intermediate portions of the clips, said intermediate portions following the contour of the feed roll, and being spaced away from the latter only sufficiently to receive the record sheet. In so far as above described, the slotted clips L are of the usual form, but they are preferably formed as shown, with special pointer-like projections L' by which the proper time setting of the record sheet is secured, as hereinafter explained.

The cross frame member G is of inverted trough-shape, and is formed at its uppermost portion with an uprising rib G' which forms a straight edge over which the record sheet R is drawn and against which the paper is pressed by the pointer D' in the record forming operation. The cross member F in addition to forming a connecting brace between the side member C serves as a guide for threading the loose end of the record strip from a fresh supply roll on the supply spindle J, into place above the record sheet supporting guide G. The front cross member H which is in the form of a vertical plate, in addition to serving as a connecting brace between the side members C, forms a platform adapted to support the depending end of the record strip when, as is frequently required, a pen or pencil endorsement is to be made on the record strip R', particularly just before a depending section of the record strip is to be severed from the portion of the record strip engaging the feed roll I. This platform may also be of assistance in the actual operation of tearing or otherwise severing the depending section of the record strip from the portion of the record strip adjacent the roll I. To make the record formed each time a pointer D' is depressed visible immediately, or as soon as possible after the record is made, the straight edge is brought as near as is practically possible to the front of the instrument, and is located well above the feed roll. Preferably also, the front side G² of the record support G is downwardly inclined toward the feed roll at a sharp angle, so that the advancing movement of the record strip is sharply downward as it moves away from the straight edge G' and into contact with the feed roll I. For the same general purpose of making all portions of the record in front of the straight edge readily accessible and comparable, the front surface of the plate H is advantageously made tangential, or practically so, to the feed roll I. To this end the upper edge of the plate H is bevelled as indicated in Fig. 5 at H'.

In the meter shown, a depressor M pivotally supported at M', is intermittently actuated by the motor Q to depress the meter pointers D' and thereby cause a record to be made on the record sheet R. The mechanism for causing the depressor M to turn about its pivotal axis M', advantageously includes a rock shaft O link-connected to the depressor M and actuated through a crank arm and suspended member P, the latter being successively engaged by the successive teeth of a toothed cam wheel Q'. This mechanism need not be further described herein, however, as it forms no part of the present invention, and is disclosed and claimed in the application of George W. Grisdale for Letters Patent Serial No. 671,962, filed October 31, 1923.

Interposed between the instrument pointer D' and the portion of the record strip above the straight edge G' at the time of making a record, is a transfer ribbon S³ of carbon paper or the like, which has its ends wound upon rolls S² carried by a supporting frame S. The frame S comprises swinging arms S' which are journaled on the shaft S⁵. To assist in making the record visible as soon as possible after being made, the frame S is normally drawn back of the straight edge G', as shown in Fig. 4, but is advanced into position above the straight edge just prior to each downward movement of the depressor M by which a record is made. The mechanism for thus advancing and retracting the ribbon and for feeding the latter is operated by the motor Q, but is not shown in detail and need not be further described herein, as it forms no part of the present invention, and is disclosed and claimed in an application for patent of George W. Grisdale Serial No. 671,963, filed October 31, 1923.

The recording mechanism is normally enclosed by a cover T which is provided with a large glass front window, and is hinge-connected at T' to the bottom of the stationary housing part A. The latter is advantageously formed with a rib or flange surrounding the walls of the meter element casing A' and uniting with the cover T to form an enclosing housing for the instrument as a whole, when the cover T is in its closed position, as shown in Fig. 1. T² represents a locking device for releasably locking the cover T in its closed position.

In an instrument of the character described, it is in general desirable that whenever the instrument is brought into service the record should be adjusted in timed relation with the driving clock motor. For example, it may well be that at each even hour one of the time indicating lines R² on the record strip should be directly above the straight edge G'. As the portion of the record strip directly above the straight edge G' is difficult to locate with precision, I have provided the pointer-like projections L' on the adjacent sides of the clips L. These projections L' are placed a known distance in advance of the straight edge G'. For example, the projections L' may well be set exactly ahead of the straight edge G' a distance corresponding to one hour's travel of the record sheet R.

The described mechanism for supporting the recording strip while the record is being made, and for guiding it over and away from the feed roll I, is characterized by its simplicity and effectiveness, and by the fact that the record formed on each depression of the depressor M becomes plainly visible from the front of the instrument as soon as the depressor I is elevated and the transfer ribbon S³ is retracted or after a very slight advance of the record strip, and in this respect the instrument embodies an important practical advantage over instruments of the general type now in use.

Another important advantage of the invention is that the depending record sheet may be severed from the portion of the sheet in operative engagement with the feed roll I at a relatively short distance from the straight edge G'. This obviously desirably shortens the time following the making of a record, when the portion of the record sheet containing such record can be removed for filing or examination.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of the invention may sometimes be used with advantage without a corresponding use of other features.

Having now described my invention what I claim as new and desire to secure by Letters Patent, is:

1. In a recording instrument comprising a meter pointer movable in a horizontal plane and means for intermittently depressing said pointer, the improved means for supporting and advancing a record sheet beneath the pointer comprising a stationary guide forming a straight edge against which the record sheet is pressed by the pointer and a record impression thereby made when the pointer is depressed, and a feed roll located directly beneath and closely adjacent to said guide and drawing the record sheet over said straight edge and sharply downward from the latter, whereby the portion of the record sheet between said guide and roll is relatively very short and the interval between the time at which the record impression is made on the sheet by the pointer and the time at which the portion of the sheet containing the last mentioned record impression can be detached without disturbing the feed of the sheet is correspondingly short.

2. In a recording instrument comprising a meter pointer movable in a horizontal plane and means for intermittently depressing the latter, the improved means for supporting and advancing a record strip beneath the pointer comprising a feed roll and guide above the feed roll forming a straight edge over which a record strip is drawn sharply downward by the feed roll, said straight edge and pointer co-operating to form a record impression on the record strip when the pointer is depressed.

3. In a recording instrument comprising a meter pointer movable in a horizontal plane and means for intermittently depressing the latter, the improved means for supporting and advancing a record strip comprising a feed roll and guide of inverted trough-like shape above the feed roll and forming a straight edge over which a record sheet is drawn sharply downward by the feed roll, said straight edge and pointer cooperating to form a record impression on the record strip when the pointer is depressed.

4. In a recording instrument comprising a meter pointer movable in a horizontal plane, the improved means for supporting a record strip and advancing it past the free end of the pointer, comprising a supporting frame and a record strip feed roll mounted in the frame adjacent the front edge of the latter, and a vertically disposed plate-like frame portion extending tangentially of the feed roll downward from the latter at the front side thereof along which the depending record strip passes and adapted to form a support for the latter when inscriptions thereon are being made.

5. In a recording instrument comprising a meter pointer movable in a horizontal plane, the improved means for supporting a record strip and advancing it past the free end of the pointer, comprising a frame formed of spaced-apart side plates, a feed roll journaled in said side plates, a record strip supply roll journalled in said side plates, and frame members connecting said side plates and forming a throat-like passage for guiding the portion of the record sheet running from the supply roll over the feed roll.

6. In a recording instrument comprising a meter pointer movable in a horizontal plane, the improved means for supporting a record strip and advancing it past the free end of the pointer comprising a straight edge beneath the path of movement of the free end of the pointer, a feed roll beneath said straight edge for feeding the record strip over the latter, guides for holding the paper in contact with the feed roll and projections thereon in spaced relation to said straight edge and cooperating with the latter in a time setting of the record strip.

7. In a recording instrument comprising a meter housing and a meter mounted therein and provided with a meter pointer movable in a horizontal plane, the improved means for supporting a record strip and advancing it past the free end of the pointer comprising a pair of spaced-apart frame parts secured to said housing, a feed roll journaled in said frame parts, a member of an inverted trough shape extending between said frame parts above said feed roll and providing a straight edge over which a record strip is drawn downwardly and sharply away from the straight edge by the feed roll, a second member connecting said frame parts at the rear of the first mentioned member and cooperating with the first mentioned member to form a throat through which the free end of a record strip may be threaded into place above and over the straight edge, and means for supporting a record strip supply roll in the lower portion of said frame.

8. In a recording instrument comprising a meter pointer movable in a horizontal plane, the improved means for supporting a record strip and advancing it past the free end of the pointer, comprising a straight edge beneath the path of movement of the free end of the pointer, means for drawing the record strip over said straight edge, and indicating provisions adjacent the path of the paper in front of the straight edge in spaced relation to said straight edge and cooperating with the latter for effecting a timed setting of the record strip.

Signed at New York city, in the county of New York, and State of New York, this 16 day of December, A. D. 1924.

RICHARD P. BROWN.